AUTOMATIC SWITCHING OF RECEIVER MODE RESPONSIVE
TO CHARACTERISTIC OF RECEIVED SIGNAL
Filed Oct. 21, 1965
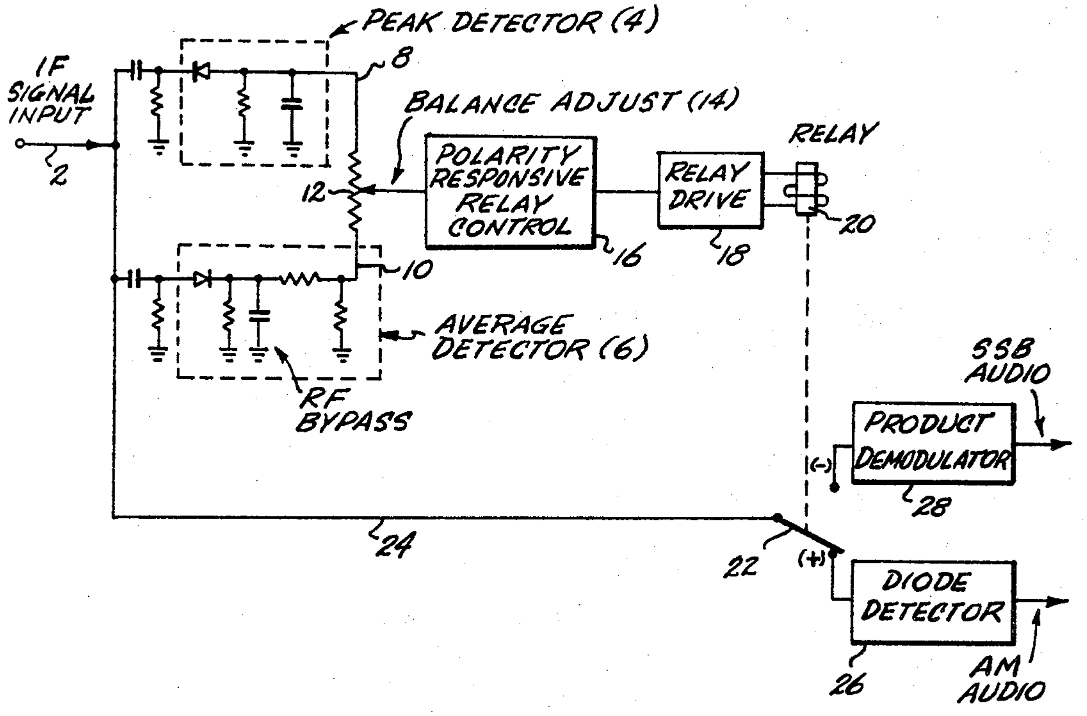
INVENTOR.
LEONARD R. KAHN
BY Graybeal, Cole & Barnard
ATTORNEYS United States Patent Office 3,401,341

Patented Sept. 10, 1968

3,401,341

AUTOMATIC SWITCHING OF RECEIVER MODE RESPONSIVE TO CHARACTERISTIC OF RECEIVED SIGNAL

Leonard R. Kahn, 81 S. Bergen Place, Freeport, N.Y. 11520

Filed Oct. 21, 1965, Ser. No. 500,005
5 Claims. (Cl. 325—316)

The present invention relates to improvements in communications receivers of the type capable of reception in either a single sideband mode or an amplitude modulated mode and having an IF section which may be switched to apply the IF output to either product demodulator means for single sideband signal detection or diode detection means for amplitude modulation signal detection. More particularly, the present invention relates to control circuitry in such communication receivers, having the capability of sensing the operation mode of the received signal (i.e. whether it is a single sideband signal or an amplitude modulated signal), and automatically applying the received signal to the appropriate detection stage.

Since the advent in recent years of both single sideband and independent sideband types of modulation for electromagnetic energy transmission, many receiver equipments are customarily provided with the capability of receiving either type of transmission and incorporate manually operable switch means (which may be either front panel mounted or remotely controlled) for switching the detection circuits of the receiver to respond to single sideband type incoming signals or amplitude modulated type incoming signals. However, manually controlled switching requires that the equipment operator make the appropriate switching changes, which consequently causes operational delay and also introduces the possibility of operator error. The automatic signal mode sensing and circuit switching arrangement and technique of the present invention has been developed to alleviate this problem.

According to the invention, the incoming signal mode is sensed by detection and comparison circuits which detect the peak voltage and the average voltage of the incoming signal and develop therefrom a control signal of one polarity when the peak-to-average ratio of the incoming signal is relatively high and a control signal of an opposite polarity when the peak-to-average ratio of the incoming signal is relatively low. As is known per se, energy transmissions in the suppressed carrier, single sideband mode are characteristically relatively high in peak-to-average voltage ratio, while amplitude modulated signals (whether of the double sideband or of the compatible single sideband type) are characteristically relatively low in peak-to-average voltage ratio. This is because a suppressed carrier signal sideband wave has a very high crest factor, giving a high peak-to-average voltage ratio, as compared with a transmitted signal having an amplitude modulated carrier. This is true even when the peaks of the amplitude modulated signal are quantitatively larger than the peaks of the single-sideband without carrier signal, since the average voltage of the amplitude modulated signal is proportionately much higher than the average voltage of the single sideband signal.

The accompanying figure is a block diagram and schematic showing of a typical circuit arrangement for practicing the invention. In said figure an IF signal, representative of the incoming signal energy, is applied to input 2 and a sample thereof is applied both to peak detector 4 and average detector 6. The detectors 4, 6 are suitably of the diode type, each conventional per se. Detector 4 develops a negative voltage at output 8 and detector 6 develops a positive voltage at output 10, which output voltages 8, 10 are respectively proportional to the peak voltage of the incoming signal. Said detector outputs 8, 10 are applied to a comparison circuit (in the circuit illustrated simply a potentiometer 12), the variable tap of which is adjustable to balance the circuit, which center tap has been designated at 14 and labeled "Balance Adjust." The control voltage appearing at the center tap 14 of potentiometer 12 is applied to a polarity responsive relay control 16 which in turn controls relay drive means 18 to selectively energize control relay 20 so that relay contact 22 is established in one operative position when the control signal at center tap 14 is positive and at its other control position when the control signal appearing at center tap 14 is negative. In such first control position, relay contact 22 applies the IF signal (through connection 24 to input 2) to the amplitude modulation detector circuits of the receiver, including diode detector 26. When the control signal appearing at center tap 14 is negative, relay 20 is energized and its contact 22 applies the IF signal input to the single sideband detection means, including product demodulator 28.

As will be apparent, other contacts controlled by relay 20 can be actuated in gang with the contact 22, to appropriately automatically switch other receiver circuits used to optimize reception of signals involving either single sideband or amplitude modulation transmission modes, such as are employed for automatic volume control in the receiver audio circuits, for example.

As will also be evident, the sensing of the peak-to-average voltage ratio of the incoming signal, in the manner characteristic of the invention, can be employed to effect other operational control than that of switching SSB and AM detector circuits, such as to disconnect or mute the AM detection section of an AM receiver when the peak-to-average voltage ratio of the incoming signal is higher than a predetermined value; for example to mute the receiver audio when the incoming signal comprises substantial impulse or pulse type noise or interference (e.g. radar).

From the foregoing, various other modifications, adaptations and applications of the invention will be apparent to those skilled in the art to which the invention is addressed, within the scope of the following claims.

What is claimed is:

1. The method of operating a communications receiver equipped to receive a modulated RF signal having a varying peak-to-average voltage ratio and applying such signal to amplitude modulation detection means and thence to a utilization circuit; said method comprising: sensing the peak voltage of the received signal; sensing the average voltage of the received signal; comparing the peak and average voltages to develop a control signal which is an indication of the peak-to-average voltage ratio of the received signal; and utilizing such control signal to cause application of the incoming signal to said amplitude modulation detection means only when said peak-to-average voltage ratio is less than a predetermined value.

2. The method of operating a communications receiver capable of reception of a received signal in either a single sideband mode or an amplitude modulated mode and having an IF section which may be switched to apply an IF output to either single sideband detection means or amplitude modulation detection means, said method comprising: sensing the peak-to-average voltage ratio of the received signal, applying the received signal to single sideband detection means responsive to a peak-to-average voltage ratio which is relatively high, and applying such received signal to amplitude modulation detection means responsive to a peak-to-average voltage ratio which is relatively low.

3. The method of operating a communications receiver capable of reception of a received signal in either a single sideband mode or an amplitude modulated mode and having an IF section which may be switched to apply an IF output to either product demodulator means for single sideband signal detection or diode detection means for amplitude modulation detection, said method comprising: sensing the peak-to-average voltage ratio of the received signal; applying the received signal to product demodulator means responsive to a peak-to-average voltage ratio which is relatively high; and applying such received signal to amplitude modulation detection means responsive to a peak-to-average voltage ratio which is relatively low.

4. In a communications receiver equipped to receive and detect either a single sideband type received signal or an amplitude modulated type received signal, the improvement comprising: means applying a sample of the received signal to peak voltage sensing means, means applying a sample of the received signal to average voltage sensing means, means comparing the outputs of said peak and average voltage sensing means and providing a control signal indicative of the peak-to-average voltage ratio of the received signal, and means responsive to said control signal for applying the received signal to amplitude modulation detection means only when said peak-to-average voltage ratio is less than a predetermined value.

5. In a communications receiver capable of reception and detection of either a suppressed carrier single sideband type signal or an amplitude modulated type signal, and having an IF section which may be switched to apply an IF output to either product demodulator means for single sideband signal detection or to diode detection means for amplitude modulation detection, the improvement whereby the mode of the received signal is sensed and the IF output is automatically applied to either said product demodulator means or said diode detection means, depending on the mode of the received signal, said improvement comprising: means applying a sample of the incoming signal to peak voltage detector means, means applying a sample of the IF signal to average voltage detector means, means combining the outputs of said detector means and providing a control signal of one polarity when the peak-to-average voltage ratio of the incoming signal is relatively high and of the other polarity when the peak-to-average voltage ratio of the incoming signal is relatively low, and relay means responsive to said control signal for applying an IF output to said product demodulator means when said control signal is of such first polarity, and applying said IF output to said diode detection means when said control signal is of such other polarity.

No references cited.

WILLIAM C. COOPER, *Primary Examiner.*

R. S. BELL, *Assistant Examiner.*